United States Patent [19]

Tanaka et al.

[11] Patent Number: 5,270,420
[45] Date of Patent: Dec. 14, 1993

[54] STRETCHED MOLDING

[75] Inventors: Masato Tanaka; Junichi Amano; Shuji Machida; Satoshi Ashai, all of Sodeguara, Japan

[73] Assignee: Idemitsu Kosan Company Limited, Tokyo, Japan

[21] Appl. No.: 908,926

[22] Filed: Jul. 16, 1992

Related U.S. Application Data

[63] Continuation of Ser. No. 657,346, Feb. 15, 1991, abandoned, which is a continuation of Ser. No. 378,383, Jul. 10, 1989, abandoned.

[30] Foreign Application Priority Data

Jul. 29, 1988 [JP] Japan .................................. 63-191916
Aug. 22, 1988 [JP] Japan .................................. 63-206373

[51] Int. Cl.$^5$ ................... C08F 210/02; B29C 55/04; B29C 55/10
[52] U.S. Cl. ................... 526/329; 264/288.4; 264/290.2; 264/291; 526/90; 526/104; 526/159; 526/160; 526/169; 526/317.1; 526/329.7; 526/348.1
[58] Field of Search ................ 264/288.4; 526/348.1, 526/329, 104

[56] References Cited

U.S. PATENT DOCUMENTS

| | | | |
|---|---|---|---|
| 3,285,766 | 11/1966 | Barkis | 156/229 |
| 4,343,851 | 8/1982 | Sheptak | 428/212 |
| 4,612,148 | 9/1986 | Motooka | 264/49 |
| 4,769,433 | 9/1988 | Chanzy | 264/288.4 |
| 4,800,121 | 1/1989 | Ohta et al. | 264/288.4 |
| 4,806,579 | 2/1989 | Calvert et al. | 264/291 |
| 4,824,619 | 4/1989 | Okada et al. | 264/288.4 |
| 4,833,224 | 5/1989 | Tanaka | 526/329 |
| 4,843,135 | 6/1989 | Tanaka | 526/169 |

FOREIGN PATENT DOCUMENTS 61-278508 12/1986 Japan .

OTHER PUBLICATIONS

Encyclopedia of Polymer Science & Technology, "Biaxial Orientation", vol. 2, 339-345 (1965).

Primary Examiner—Joseph L. Schofer
Assistant Examiner—Fred Zitomer
Attorney, Agent, or Firm—Frishauf, Holtz, Goodman & Woodward

[57] ABSTRACT

The present invention relates to a process for producing a stretched molding which comprises stretching a straight chain random copolymer having:

a repeating unit (A) represented by the formula:

$$-\!\!+\!CH_2-CH_2\!+\!\!-$$

and a repeating unit (B) represented by the formula:

$$-\!\!(CH_2-\underset{\underset{\underset{COOR^2}{|}}{(CH_2)_l}}{\overset{\overset{R^1}{|}}{C}})\!\!-$$

the proportion of said repeating unit (B) being 0.01 to 10 mol %; and
an intrinsic viscosity [η] as measured at 135° C. in decalin of at least 5 dl/g.

A stretched molding obtained by the present invention has mechanical properties equivalent or superior to those of the conventional super high molecular weight polyethylene stretched molding and is excellent in adhesive properties, dyeability, printability and so on, and thus is greatly useful as an industrial material required to have high strength and further good adhesive properties and printability.

7 Claims, No Drawings

STRETCHED MOLDING

This is a continuation of application Ser. No. 07/657,346 filed Feb. 15, 1991 which is a continuation of application Ser. No. 07/378,383 filed Jul. 10, 1989 both now abandoned.

BACKGROUND OF THE INVENTION

The present invention relates to a process for production of stretched moldings. More particularly, it is concerned with a process for producing stretched moldings which are equivalent or superior to moldings of super or ultra high molecular weight polyethylene in mechanical properties and which are excellent in properties such as adhesive properties, dyeability and print-ability.

Ultra high molecular weight polyethylene is excellent in properties such as impact resistance, abrasion resistance and self-lubricating properties, and its mechanical strength and modulus of elasticity can be increased by highly stretching. Thus it is increasingly finding applications as an engineering plastics.

This super high molecular weight polyethylene, however, has disadvantages of being poor in adhesive properties and dyeability because of its chemical stability, and thus is limited in its use. In particular, poor adhesive properties place a serious hindrance in production of composite material using ultra high molecular weight polyethylene. For example, when ultra high molecular weight polyethylene is used as a reinforcing material in production of e.g., concrete, helmets or pressure containers, adhesive properties to the matrix or other materials are poor.

Various surface treatments are applied to improve adhesive properties and dyeability of ultra high molecular weight polyethylene. For example, a sanding method, a flaming method (heat treatment) or an oxidizing method is applied. These methods, however, deteriorate the performance inherent to the polymer because they cause molecular cutting or formation of structural defects. Another method is to graft polymerize a polar group-containing monomer. This method, however, causes branching of the molecule or produces a domain. Thus in accordance with this method, it is difficult to produce moldings having excellent performance. Moreover, because these methods are post treatment, one additional step is needed, and problems arise in difficulties in determining conditions and in production costs.

A number of methods have been proposed for production of ultra high molecular weight polyethylene, but a method for production of ultra high molecular weight ethylene-based copolymer has not been disclosed. The reason for this is that such ultra high molecular weight ethylene-based copolymers are limited in their use, because chain transfer to the comonomer frequently occurs and their mechanical properties are much inferior to those of ultra high molecular weight polyethylene.

An ethylene-(meta)acrylate copolymer has heretofore been produced by the high pressure radical polymerization method (200° C. and more than 1,000 atmospheric pressure).

In this method, however, in the presence of a catalyst chain transfer involves monomer, solvent and so on, including chain transfer between molecules and, therefore, a weight average molecular weight (Mw) of more than 1,000,000 which is commonly called a ultra high molecular weight is not attained; usually the weight average molecular weight is only less than 100,000.

The copolymer obtained by the above conventional method is branched in structure. Thus even if a copolymer having a super high molecular weight can be obtained, features characteristic of ultra high molecular weight polymer, such as high stiffness, are not sufficiently exhibited.

In Japanese Patent Publication No. 23317/1974 and Japanese Patent Application Laid-Open No. 278508/1986, for example, a method of copolymerizing ethylene and unsaturated carboxylic acid or its ester under low pressure in the presence of Lewis acid is disclosed. In accordance with this method, however, a so-called ultra high molecular weight ethylene-based copolymer has not obtained.

As copolymers of ethylene and polar group-containing monomers (e.g., an ethylene-ethyl acrylate copolymer), as described above, copolymers having a high ethylene content have been obtained by the high pressure radical polymerization method. In these copolymers, however, the molecular weight is low, and long chain branches are present. Thus a copolymer excellent in mechanical strength, modulus of elasticity and so on like ultra high molecular weight polyethylene has not been obtained.

SUMMARY OF THE INVENTION

As a result of investigations to overcome the above conventional problems, it has been found that stretching of an ultra high molecular weight copolymer having a specified structure results in the production of a high molecular weight material which is excellent in mechanical strength and modulus of elasticity and which has good adhesive properties and dyeability.

The present invention relates to a process for producing a stretched molding which comprises stretching a straight chain random copolymer having:

a repeating unit (A) represented by the formula:

$$+CH_2-CH_2+ \quad (I)$$

and a repeating unit (B) represented by the formula:

$$+CH_2-\underset{\underset{\underset{COOR^2}{|}}{(CH_2)_l}}{\overset{\overset{R^1}{|}}{C}}+ \quad (II)$$

(wherein $R^1$ represents a hydrogen atom, an alkyl group having 1 to 20 carbon atoms, an alkenyl group having 2 to 20 carbon atoms, a cycloalkyl group having 3 to 20 carbon atoms, an aryl group having 6 to 20 carbon atoms or an aralkyl group having 7 to 20 carbon atoms, $R^2$ represents a hydrogen atom, a halogen atom, an alkyl group having 1 to 20 carbon atoms, an alkenyl group having 2 to 20 carbon atoms, a cycloalkyl group having 3 to 20 carbon atoms, an aryl group having 6 to 20 carbon atoms, an aralkyl group having 7 to 20 carbon atoms, or an ion of a metal of Group I, II, III, IVA or VIII of the Periodic Table, and l is an integer of 0 to 20), the proportion of said repeating unit (B) being 0.01 to 10 mol %; and an intrinsic viscosity [η] as measured in decalin at 135° C. of at least 5 dl/g.

DETAILED DESCRIPTION OF THE INVENTION

The copolymer to be used in the present invention comprises a repeating unit (A) represented by the formula (I) (i.e., an ethylene unit) and a repeating unit (B) represented by the formula (II) (i.e., an unsaturated carboxylic acid or its derivative unit). The copolymer has a random chain which is straight and does not have a long chain branch (but may have some olefin short chain branches). The copolymer may contain two or more types of the repeating unit (B).

In this copolymer, the proportion of the repeating unit (B) is 0.01 to 10 mol % and preferably 0.05 to 5 mol %. If the repeating unit (B) content is less than 0.01 mol %, adhesive force and printability are not sufficiently high. On the other hand, if it is more than 10 mol %, the stretching effect is not sufficiently obtained.

In connection with the molecular weight, the intrinsic viscosity [$\eta$] as determined in decalin at 135° C. is at least 5 dl/g and preferably at least 10 dl/g and more preferably at least 15 dl/g. If the intrinsic viscosity [$\eta$] is less than 5 dl/g, the stretching effect is obtained only insufficiently.

Specific examples of the repeating unit (B) represented by the formula (II) are an acrylic acid unit, a methyl acrylate unit, an ethyl acrylate unit, a n-propyl acrylate unit, an i-propyl acrylate unit, a n-butyl acrylate unit, an i-butyl acrylate unit, a tert-butyl acrylate unit, a n-hexyl acrylate unit, a n-octyl acrylate unit, a 2-ethylhexyl acrylate unit, a benzyl acrylate unit, a methacrylate unit, a methyl methacrylate unit, an ethyl methacrylate unit, a n-propyl methacrylate unit, an i-propyl methacrylate unit, a n-butyl methacrylate unit, an i-butyl methacrylate unit, a tert-butyl methacrylate unit, a 2-ethylhexyl methacrylate unit, a phenyl methacrylate unit, a methyl $\alpha$-chloroacrylate unit, an ethyl $\alpha$-chloroacrylate unit, and a methyl $\alpha$-phenylacrylate unit.

Specific examples of the repeating unit (B) containing a metal ion are a sodium acrylate unit, a potassium acrylate unit, a lithium acrylate unit, a calcium acrylate unit, a magnesium acrylate unit, a zinc acrylate unit, a tin acrylate unit, an aluminum acrylate unit, an iron acrylate unit, a sodium methacrylate unit, a calcium methacrylate unit, a zinc methacrylate unit, a tin methacrylate unit, a copper methacrylate unit, an aluminum methacrylate unit, an iron methacrylate unit, a sodium $\alpha$-chloroacrylate unit, a calcium $\alpha$-chloroacrylate unit, a zinc $\alpha$-chloroacrylate unit, a tin $\alpha$-chloroacrylate unit, a copper $\alpha$-chloroacrylate unit, an aluminum $\alpha$-chloroacrylate unit, an iron $\alpha$-chloroacrylate unit, a sodium $\alpha$-phenylacrylate unit, a calcium $\alpha$-phenylacrylate unit, a zinc $\alpha$-phenylacrylate unit, a tin $\alpha$-phenylacrylate unit, a copper $\alpha$-phenylacrylate unit, an aluminum $\alpha$-phenylacrylate unit, and an iron $\alpha$-phenylacrylate unit.

In connection with the repeating unit (B), l in the formula (II) is 0 to 20 and preferably 0 to 5. If l is more than 20, the stretching effect is obtained only insufficiently.

The copolymer to be used in the present invention is, as described above, a super or ultra high molecular weight polymer, has a random chain, and is straight and does not contain a long chain branch. In some cases, the copolymer to be used in the present invention has partially an olefin short chain branch in the molecule. In these cases, however, a reduction in strength and modulus of elasticity generally occurring owing to the presence of a branch in the molecule is not observed, and the copolymer has high strength and high modulus of elasticity.

The ultra high molecular weight copolymer to be used in the present invention can be produced by various methods. For example, the ultra high molecular weight ethylene copolymer can be produced by copolymerizing ethylene and unsaturated carboxylic acid or its derivative using a catalyst containing (A) a chromium compound and (B) an organometallic compound containing Group I, II, III, IV or V element of the Periodic Table as main components in the presence of Lewis acid and further under conditions that;

(i) the concentration of the chromium compound component is not more than 10 mmol per liter of a polymerization solvent;

(ii) the concentration of the organometallic compound component is not more than 100 mmol per liter of the polymerization solvent;

(iii) the molar ratio of the organometallic compound to the chromium compound (organometallic compound/chromium compound) is at least 2;

(iv) the molar ratio of the chromium compound to the unsaturated carboxylic acid or its derivative (chromium compound /unsaturated carboxylic acid or its derivative) is at least 0.001;

(v) the ethylene pressure is not more than 100 kg/cm$^2$G; and (vi) the polymerization temperature is not more than 60° C.

In the above process, as the component (A) of the catalyst, i.e., transition metal component, a chromium compound is used.

Examples of the chromium compound are carboxylic acid salts of chromium, chromium alkoxy compounds, chromium chelate compounds, chromium $\pi$-complexes, chromium aryl compounds and chromium halides, and further chromium oxides, chromium sulfides, chromium nitrides, chromium alkylated compounds, chromium carbonyl compounds, and chromium inorganic salts.

As the carboxylic acid salt of chromium, compounds represented by the general formula:

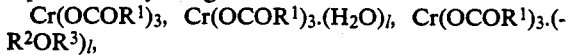

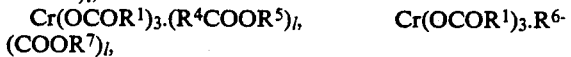

$Cr(OCOR^1)_3 \cdot [R^3{}_2CO]_l$ or $Cr(OCOR^1)_3 \cdot [(R^9CO)_2O]_l$ (wherein $R^1$ to $R^9$ are each an alkyl group having 1 to 20 carbon atoms, an alkenyl group, a vinyl group, a cycloalkyl group, an aryl group, an haloalkyl group, an aralkyl group or a hydrogen atom, and l is a real number of at least 1). Specific examples are aliphatic carboxylic acid salts, e.g.,

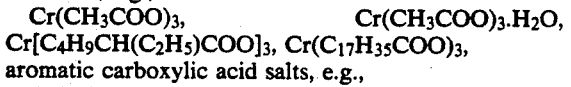

aromatic carboxylic acid salts, e.g.,

$Cr(C_{10}H_7COO)_3$, and carboxylic acid anhydride adducts, water adducts, ester adducts, ether adducts and ketone adducts of the above carboxylic acid salts. Examples are aliphatic acid anhydrides such as acetic anhydride, propionic anhydride, butyric anhydride, isobutyric anhydride, valeric anhydride, isovaleric anhydride, and maleic anhydride; aromatic anhydrides such as benzoic anhydride, toluic anhydride, cinnamic anhydride, and phthalic anhydride; aliphatic esters such as methyl formate, ethyl formate, propyl formate, butyl formate, methyl acetate, ethyl acetate, propyl acetate, butyl acetate, hexyl acetate, octyl acetate, vinyl acetate, phenyl acetate, benzyl acetate, cyclohexyl acetate, methyl propionate, ethyl propionate, propyl propionate, butyl propionate, octyl propionate, phenyl propionate, benzyl propionate, methyl butyrate, ethyl butyrate, propyl butyrate, butyl butyrate, amyl butyrate, octyl butyrate, methyl valerate, ethyl valerate, propyl valerate, butyl valerate, methyl acrylate, ethyl acrylate, butyl acrylate, 2-ethylhexyl acrylate, methyl methacrylate, ethyl methacrylate, butyl methacrylate, methyl chloroacetate, ethyl dichloroacetate, ethyl crotonate, ethyl pivalate, dimethyl maleate, and ethyl cyclohexanecarboxylate; aromatic esters such as methyl benzoate, ethyl benzoate, propyl benzoate, butyl benzoate, octyl benzoate, cyclohexyl benzoate, benzyl benzoate, methyl toluilate, ethyl toluilate, ethyl ethylbenzoate and ethyl anisicate; ethers such as methyl ether, ethyl ether, isopropyl ether, n-butyl ether, amyl ether, tetrahydrofuran, anisole, and diphenyl ether; and ketones such as acetone, methyl ethyl ketone, methyl isobutyl ketone, acetophenone, benzophenone, and benzoquinone.

As the chromium alkoxy compound, compounds represented by the general formula:

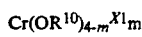

$$Cr(OR^{10})_{4-m}X^1{}_m \qquad (I)$$

are usually used. In the general formula (I), $R^{10}$ represents an alkyl group having 1 to 20 carbon atoms, an alkenyl group having 1 to 20 carbon atoms, a cycloalkyl group having 3 to 20 carbon atoms, an aryl group having 6 to 20 carbon atoms or an aralkyl group having 7 to 20 carbon atoms. Representative examples of $R^{10}$ are a methyl group, an ethyl group, a n-propyl group, an i-propyl group, a n-butyl group, an i-butyl group, a tert-butyl group, a hexyl group, a 2-ethylhexyl group, and a phenyl group. $X^1$ represents a halogen atom, i.e., chlorine, bromine or iodine. m is a real number satisfying the relation $0 \leq m < 4$.

Specific examples of the compound represented by the above general formula (I) are tetramethoxychromium, tetraethoxychromium, tetra-n-butoxychromium, tetra-i-butoxychromium, tetra-tert-butoxychromium, tetrahexyloxychromium, tetrastearyloxychromium, tetraphenoxychromium, triethoxychromium monochloride, diethoxychromium dichloride, tri-n-butoxychromium monochloride and tri-tert-butoxychromium monochloride.

The above chromium chelate compound includes chromium trisacetylacetonate represented by the formula: $Cr(acac)_3$, chromium tris(2-methyl-1,3-butanedionate) represented by the formula: $Cr(mbd)_3$, and chromium tris(1,3-butanedionate) represented by the formula: $Cr(bd)_3$, chromium tris(trifluoroacetylacetonate), chromium tris(hexafluoroacetylacetonate) and the like.

The symbol "(acac)" indicates an acetylacetonate group. Chromium trisacetylacetonate has the following structural formula:

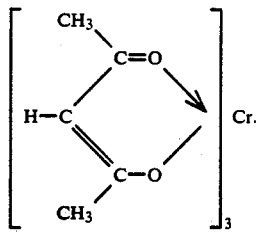

The symbol "(mbd)" indicates a 2-methyl-1,3-butanedionate group. Chromium tris(2-methyl-1,3-butanedionate) has the following structural formula:

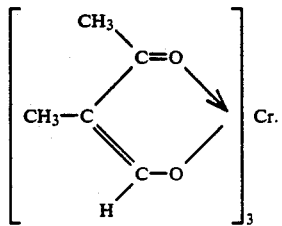

The symbol "(bd)" indicates a 1,3-butanedionate group. Chromium tris(1,3-butanedionate) has the following structural formula:

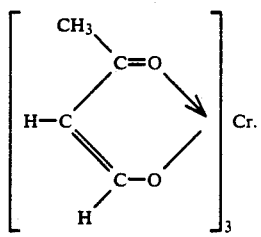

Chromium tris(trifluoroacetylacetonate) has the following structural formula:

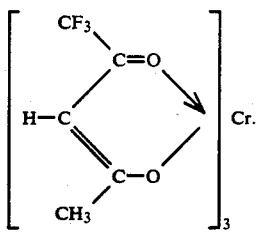

Chromium tris(hexafluoroacetylacetonate) has the following structural formula:

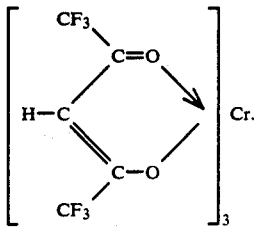

Typical examples of the chromium π-complex are aromatic ring-π complexes such as biscyclopentadienyl chromium represented by the formula: (cp)₂Cr (wherein (cp) indicates a cyclopentadienyl group), bisbenzene chromium represented by the formula: $(C_6H_6)_2Cr$, diphenylbenzene chromium represented by the formula: $(2C_6H_5)(C_6H_6)Cr$, dihexamethylbenzene chromium represented by the formula:

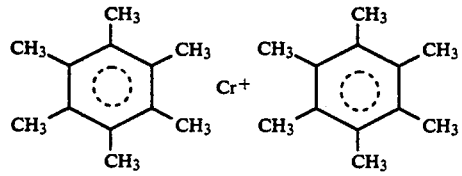

π-cyclopentadienylbromochromium acetylacetonate represented by the formula:

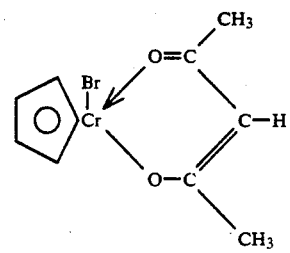

π-cyclopentadienyl(benzene)chromium represented by the formula:

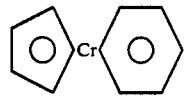

and π-cyclopentadienyl-π-cycloheptadienyl chromium represented by the formula:

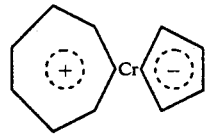

, and π-aryl complexes such as tris(η-allyl)chromium and tetraquis(η-allyl)chromium.

In addition, diphenyl chromium, tetraphenyl-tris(tetrahydrofuran) and the like can be used as the chromium aryl compound.

Preferred examples of the above chromium halide are compounds represented by the general formula: $CrX^1_n$ (wherein $X^1$ represents a halogen atom, and n is 2 or 3). Specific examples are chromium trichloride, chromium tribromide, chromium triiodide, chromium dichloride, chromium dibromide, chromium diiodide, chromyl chloride ($CrO_2Cl_2$), and oxygen-containing halides such as hydroxychromium dichloride ($Cr(OH)Cl_2$) and chromium perchlorate ($Cr(ClO_4)_3$).

Examples of the chromium oxide and the chromium sulfide are $CrO_3$, $Cr_2O_3$, $CrO$, $Cr_2S_3$, $CrCuS_2$, $CrLiS_2$ (lithium-chromium sulfide), and $Cr(SO_4)_3$ (chromium sulfite).

Examples of the chromium nitride are

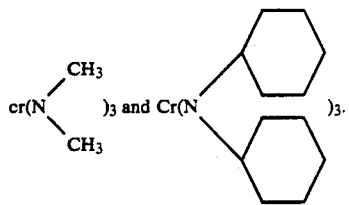

An example of the chromium alkylated compound is $Cr(CH_2C(CH_3)_3)_4$.

An example of the chromium carbonyl compound is $Cr(CO).para\text{-}xylene$.

Examples of the chromium inorganic salt are $Cr(NO_3)_3$, $Cr(PO_4)_3$, $CrK(SO_4)_2$, $Cr_2(SO_4)_3.K_2SO_4$ (chromiumpotassium sulfate), $CrNa(SO_4)_2$, $Cs_2CrO_4$, $CrLiO_2$, $CrBaO_4$, $(NH_4)_2CrO_4$ (ammonium chromate), $K_2CrO_4$ (potassium chromate), $K_3CrO_8$ (potassium perchromate), $Li_2CrO_4$ (lithium chromate), $Na_2CrO_4$ (sodium chromate), $PbCrO_4$ (lead chromate), $Pb_2CrO_4$ (rubisium chromate), $SrCrO_4$ (strontium chromate), $CoCr_2O_4$ (cobalt chromite), $K_2Cr_2O_7$ (potassium dichromate), $MgCr_2O_4$ (magnesium chromite), $MnCr_2O_4$ (manganese chromite), $NiCr_2O_4$ (nickel chromite), $Na_2Cr_2O_7$ (sodium dichromate), and $ZnCr_2O_4$ (zinc chromite).

In addition, the aforementioned inorganic chromium compound adducts and the adducts of $CrCl_3$ and acetone, acetonitrile, tetrahydrofuran, ethyl acrylate, etc. can be used. Examples of the inorganic chromium compound adduct are a $CrO_3.pyridine$ complex, a $CrO_3Cl.C_{10}H_9N_2$ complex, a $CrOCl_5.C_{10}H_9N_2$ complex, and hydrates such as $CrNa(SO_4)_2.12H_2O$ and $CrK(SO_4)_2.12H_2O$.

As the component (A) of the catalyst to be used in the aforementioned process, at least one selected from the above chromium compounds is used. Of these compounds, carboxylic acid salts of chromium, chromium acetylacetonate salts, $CrO_3$, $Cr_2O_3$, and $CrO_2Cl_2$ are particularly effective.

In the aforementioned process as the component (A) (transition metal component) of the catalyst, a polymerization activator can be used in combination with the above chromium compound.

As the polymerization activator, at least one selected from the group consisting of carboxylic acid salts, organic phosphoric acid salts, organic phosphorous acid salts, alkoxides and halides of magnesium or manganese, and carboxylic acid salts and halides of calcium can be used.

More specifically, these magnesium and manganese salts are magnesium carboxylates represented by the general formula: $Mg(R^{11}COO)_2$ or $Mg(R^{11}COO)X^2$ (wherein $R^{11}$ is an alkyl group having 1 to 20 carbon atoms, an aryl group or an aralkyl group, and $X^2$ is a halogen atom), and manganese carboxylates represented by the general formula: $Mn(R^{11}COO)_2$ or $Mn(R^{11}COO)X^2$ (wherein $R^{11}$ and $X^2$ are the same as defined above), and further calcium carboxylates represented by the general formula: $Ca(R^{11}COO)_2$ or $Ca(R^{11}COO)X^2$ (wherein $R^{11}$ and $X^2$ are the same as defined above).

In the above general formulae, $R^{11}$ is preferably an aliphatic alkyl group having not less than 6 carbon atoms and more preferably an aliphatic alkyl group having not less than 8 carbon atoms. Typical examples are a hexyl group, a heptyl group, an octyl group, a 2-ethylhexyl group, a nonyl group, a decyl group, a lauryl group, a myristyl group, a heptadecyl group and a stearyl group. In addition, unsaturated alkyl groups such as an oleyl group can be used.

Various organic phosphoric acid salts and organic phosphorous acid salts of magnesium and manganese can be used. Of these, compounds derived by reacting organomagnesium compounds or organomanganese compounds and hydrogen-containing phosphorus compounds are preferably used.

Suitable examples of the organomagnesium compounds and organomanganese compounds are compounds represented by the general formula: $R^{12}R^{13}M^1$ (wherein $R^{12}$ and $R^{13}$ are each an alkyl group having 1 to 10 carbon atoms or an aryl group, and $M^1$ is magnesium or manganese), or by the general formula: $R^{12}M^1X^3$ (wherein $R^{12}$ is an alkyl group having 1 to 10 carbon atoms, or an aryl group, $M^1$ is magnesium or manganese, and $X^3$ is a halogen atom). Typical examples are ethylbutylmagnesium, dibutylmagnesium, diethylmagnesium, dihexylmagnesium, dimethylmanganese, diphenylmanganese, ethylmagnesium chloride, ethylmagnesium iodide, and methylmanganese iodide. In addition, the organoaluminum or organozinc complexes of the above compounds can be used.

Examples of the hydrogen-containing phosphorus compounds are alkyl or arylphosphines such as methylphosphine, ethylphosphine, propylphosphine, butylphosphine, and phenylphosphine; dialkyl or diarylphosphines such as diethyl phosphine, dipropylphosphine, dibutylphosphine, and diphenylphosphine; alkyl or arylphosphonic acids such as ethylphosphonic acid and propylphosphonic acid; dialkyl or diarylphosphinic acids such as diethylphosphinic acid, dipropylphosphinic acid, dibutylphosphinic acid, didodecylphosphinic acid, and diphenylphosphinic acid; phosphorous acid esters such as methyl phosphite, butyl phosphite, dimethyl phosphite, dipropyl phosphite, dibutyl phosphite, dodecyl phosphite, dilauryl phosphite, dioleyl phosphite, and diphenyl phosphite; and phosphoric acid esters such as ethyl phosphate, propyl phosphate, dipropyl phosphate, dibutyl phosphate, dioctyl phosphate, and didodecyl phosphate.

Examples of magnesium or manganese alkoxide are magnesium dialkoxides such as magnesium dimethoxide, magnesium diethoxide, magnesium dipropoxide, magnesium dibutoxide, magnesium diheptoxide, magnesium dioxtoxide and magnesium distearoxide, or manganese dialkoxides such as manganese dibutoxide, manganese dioctoxide, and manganese distearoxide. Of these compounds, long chain alkyl group-containing compounds are suitable because they are present in a microgel form or soluble in a hydrocarbon solvent, e.g., hexane, heptane or toluene. Particularly preferred are compounds having a hydrocarbon group having 6 to 20 carbon atoms.

In addition, as the polymerization activator, halides of magnesium, manganese or calcium can be used. That is, although there are various metal halides, compounds in which the electronegativity of metal ion is smaller than that of chromium (II) ion are preferred. Thus the polymerization activator is choosen from the above three metal halides. More specifically, for example, $MgCl_2$, $MgBr_2$, $MgI_2$, $MnCl_2$, $MnBr_2$, $MnI_2$, $CaCl_2$, $CaBr_2$ and $CaI_2$ can be used.

When the polymerization activator is used, it is usually sufficient that the component (A) (chromium compound) and a polymerization activator are added to a suitable solvent and mixed, stirred at a temperature of 0° to 200° C., preferably about 30° to 100° C. for about 5 to 60 minutes, and used as the transition metal component. The mixing ratio of the chromium compound to the polymerization activator varies with the type of the compound to be used and so on. In general, as the ratio of the polymerization activator to the chromium compound is larger, the catalytic activity is more increased. More specifically, the polymerization activator is used in an amount of 1 to 100 mol, preferably 20 to 50 mol per mol of the chromium compound.

In the aforementioned process, as the component (B) of the catalyst (i.e., organometallic component), an organometallic compound containing a Group I, II, III, IV or V element of the Periodic Table is used.

As the organometallic compound containing Group I, II, III, IV or V element of the Periodic Table, compounds represented by the general formula:

$$R^{14}{}_k M^2 X^4{}_{i-k} \qquad (II)$$

are used. In the general formula (II), $R^{14}$ represents an alkyl group having 1 to 20 carbon atoms, an alkenyl group, a cycloalkyl group, an aryl group and an aralkyl group. Specific examples of $R^{14}$ are a methyl group, an ethyl group, a n-propyl group, an i-propyl group, a n-butyl group, an i-butyl group, a hexyl group, a 2-ethylhexyl group, and a phenyl group. $M^2$ represents lithium, sodium, potassium, magnesium, zinc, cadmium, aluminum, boron, gallium, silicon, tin, antimony or bismuth. $X^4$ represents a halogen atom, e.g., chlorine, bromine or iodine. i is an atomic valency of $M^2$ and usually a real number of 1 to 5. k is a real number of $0 < k \leq i$.

Specific examples of the compound represented by the general formula (II) are alkyllithium such as methyllithium, ethyllithium, propyllithium or butyllithium; alkylmagnesium such as diethylmagnesium, ethylbutylmagnesium, di-n-butylmagnesium or ethylchloromagnesium; dialkylzinc such as dimethylzinc, diethylzinc, dipropylzinc or dibutylzinc; alkylgallium compounds such as trimethylgallium, triethylgallium, tripropylgallium or tributylgallium; alkylboron compounds such as triethylboron, tripropylboron or tributylboron; and alkyltin compounds such as tetraethyltin, tetrapropyltin, tributylchlorotin, tetraphenyltin or triphenylchlorotin.

Specific suitable examples of compounds in which $M^2$ is aluminum include trialkylaluminum compounds such as trimethylaluminum, triethylaluminum, triisopropylaluminum, triisobutylaluminum or trioctylaluminum; dialkylaluminum monohalides such as diethylaluminum monochloride, diethylaluminum monobromide, diethylaluminum monoiodide, diisopropylaluminum monochloride, diisobutylaluminum monochloride or dioctylaluminum monochloride; and alkylaluminum sesquihalides such as methylaluminum sesquichloride, ethylaluminum sesquichloride, ethylaluminum sesquibromide or butylaluminum sesquichloride. In addition, mixtures of the above aluminum compounds are preferably used. In addition, alkyl group-containing aluminoxanes resulting from the reaction of alkylaluminum and water can be used.

Of these compounds, aluminum compounds, tin compounds and magnesium compounds are preferably used.

In accordance with the aforementioned process an ethylene-based copolymer having an ultra high molecular weight is produced by copolymerizing ethylene and unsaturated carboxylic acid or its derivative by the solution polymerization method or the slurry polymerization method by the use of the above catalyst in the presence of Lewis acid. This copolymerization should be carried out under the following conditions.

(i) The concentration of the chromium compound component is not more than 10 mmol, preferably not more than 1 mmol per liter of a polymerization solvent.

(ii) The concentration of the organometallic compound component is not more than 100 mmol, preferably not more than 10 mmol per liter of a polymerization solvent.

(iii) The ratio of the organometallic compound to the chromium compound, i.e., organometallic compound/chromium compound (molar ratio of metal atoms) is at least 2 and preferably at least 5.

(iv) The ratio of the chromium compound to the unsaturated carboxylic acid or its derivative, i.e., chromium compound/unsaturated carboxylic acid or its derivative (molar ratio) is at least 0.001 and preferably at least 0.005.

(v) The ethylene pressure is not more than 100 kg/cm$^2$ and preferably not more than 30 kg/cm$^2$G.

(vi) The polymerization temperature is not more than 60° C. and preferably not more than 40° C.

It is under the above conditions that the desired super or ultra high molecular weight ethylene-based copolymer can be produced with high productivity. That is, if one of the above conditions is not satisfied, it is not possible to produce a super or ultra high molecular weight ethylene-based copolymer having a weight average molecular weight of at least 1,000,000 with high productivity.

As the Lewis acid, Lewis acid compounds capable of forming a complex with a lone electron pair of a polar group, for example, alkylated compounds or halogen compounds of Group I, II, III, IV, V or VIII element of the Periodic Table can be used. For example, halogenated compounds of aluminum, boron, zinc, tin, magnesium or antimony, e.g., aluminum chloride, aluminum bromide, ethylaluminum dichloride, ethylaluminum sesquichloride, diethylaluminum dichloride, triethylaluminum, trimethylaluminum, boron trichloride, zinc chloride, tin tetrachloride, alkyl tin halide, magnesium chloride, antimony pentachloride and antimony trichloride are preferred. Of these, aluminum chloride, aluminum bromide, and ethylaluminum dichloride are particularly preferred.

As the unsaturated carboxylic acid or its derivative to be copolymerized with ethylene, compounds represented by the general formula:

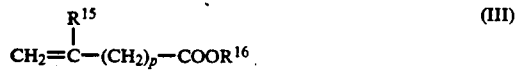

(III)

are used. In the general formula (III), $R^{15}$ represents a hydrogen atom, an alkyl group having 1 to 20 carbon atoms, an alkenyl group having 2 to 20 carbon atoms, a cycloalkyl group having 3 to 20 carbon atoms, an aryl group having 6 to 20 carbon atoms or an aralkyl group having 7 to 20 carbon atoms, and $R^{16}$ represents a hydrogen atom, a halogen atom, an alkyl group having 1 to 20 carbon atoms, an alkenyl group having 2 to 20 carbon atoms, a cycloalkyl group having 3 to 20 carbon atoms, an aryl group having 6 to 20 carbon atoms or an aralkyl group having 7 to 20 carbon atoms. $R^{15}$ and $R^{16}$ may be the same or different. The letter p represents an integer of 0 to 20.

Specific examples of the unsaturated carboxylic acid represented by the general formula (III) are acrylic acid, methacrylic acid, α-chloroacrylic acid, 3-butenic acid, 4-pentenic acid, 6-heptenic acid, 8-nonenic acid, and 10-undenenic acid. These compounds can be used alone or in combination with each other.

Specific examples of the unsaturated carboxylic acid ester represented by the general formula (III) are acrylic acid esters such as methyl acrylate, ethyl acrylate, propyl acrylate, butyl acrylate, n-octyl acrylate, 2-ethylhexyl acrylate and benzyl acrylate; α-substituted acrylic acid esters such as methyl methacrylate, ethyl methacrylate, butyl methacrylate, 2-ethylhexyl methacrylate, phenyl methacrylate, methyl α-chloroacrylate, and ethyl α-chloroacrylate; and carboxylic acid esters having a terminal double bond, such as methyl 3-butenate, ethyl 3-butenate, methyl 4-pentenate, ethyl 6-heptenate, methyl 8-nonenate, methyl 10-undecenate, propyl 10-undecenate, butyl 10-undecenate, hexyl 10-undecenate, octyl 10-undecenate, decyl 10-undecenate, cyclohexyl 10-undecenate, and phenyl 10-undecenate. These compounds can be used alone or in combination with each other.

The ratio of the unsaturated acid or its derivative to ethylene can be determined appropriately depending on physical properties required for the objective copolymer.

In connection with the ratio of the Lewis acid to the unsaturated carboxylic acid or its derivative, the molar ratio of the unsaturated carboxylic acid or its derivative to the Lewis acid is not more than 10:1 and preferably 0.2:1 to 2:1.

As the polymerization solvent to be used in the aforementioned process, aliphatic hydrocarbons, alicyclic hydrocarbons, aromatic hydrocarbons and halogenated hydrocarbons are used. More specifically, pentane, hexane, heptane, octane, decane, dodecane, cyclohexane, benzene, toluene, xylene, ethylbenzene, chlorobenzene, ethylene dichloride, or kerosine is used.

The polymerization time is usually chosen within the range of one minute to 10 hours.

In accordance with the aforementioned process, a super or ultra high molecular weight ethylene-based polymer having a weight average molecular weight of at least 1,000,000 can be produced. That is, the aforementioned process permits production of an ethylene-based copolymer having an intrinsic viscosity [η] as measured in decalin at 135° C. of at least 15 dl/g.

The unsaturated carboxylic acid (ester) content of the copolymer thus obtained is not more than 10 mol %, and the conversion of the unsaturated carboxylic acid or its ester into the copolymer can be increased.

In accordance with the aforementioned process, copolymerization can be carried out with high activity and in high yield.

The copolymer obtained by the aforementioned process is straight and does not have a long chain-branched structure, and thus is excellent in properties such as stiffness.

Copolymerization of ethylene and unsaturated carboxylic acid or its derivative by the use of the specified catalyst in the presence of Lewis acid under the specified conditions results in a ultra high molecular weight ethylene-based copolymer.

A partially ionized copolymer can be obtained by reacting the ethylene-based copolymer as obtained above with an alkali metal salt, e.g., NaOH, KOH, or Zn(OCOCH$_3$)$_3$. The ionized product of the super high molecular weight copolymer can be suitably used.

One of the features of the present invention is to stretch mold the ultra high molecular weight straight random copolymer having the specified structure. This stretch molding includes stretching and spinning.

This stretching or spinning can be carried out by the commonly employed method, such as the monoaxial stretching or biaxial stretching method, the solid phase extrusion method, the gel spinning method, the gel mat super stretching method, the monocrystalline laminated mat super stretching method, the zone stretching method or the wax blend spinning method. These methods can be carried out in combination with each other. In this case, the stretching temperature is desirable to be in the vicinity of the crystal dispersion temperature of the copolymer obtained and generally is 100° to 140° C. In connection with the stretching ratio, stretching to about 400 times is possible. The ratio of stretching is preferably more than 100 times and more preferably from 250 to 350 times.

By stretch molding using the above stretching or spinning method, a stretched molding such as sheet, rod, film, fiber, robing or prepreg, and its composite material or fabricated material can be obtained.

A stretched molding obtained by the present invention has mechanical properties (e.g., strength or modulus of elasticity) equivalent or superior to those of the conventional ultra high molecular weight polyethylene stretched molding and is excellent in adhesive properties, dyeability, printability and so on, and thus is greatly useful as an industrial material required to have high strength and further good adhesive properties and printability.

The present invention is described in greater detail with reference to the following examples although it is not intended to be limited thereto.

Evaluation of dyeability, evaluation of fastness of color, and measurement of critical surface tension were carried out as follows.

Evaluation of Dyeability

A stretched molding was dipped in 100 ml of an aqueous solution containing 1 g of Methylene Blue and 1 g of Rhodamine B as dyes and dyed under reflux for 4 hours. Thereafter, the sample was washed with boiling water for 2 hours and then with soap water and water. The rating of dyeability was as follows:
○: good dyeability
Δ: bad dyeability
x: Dyeing is impossible.

Evaluation of Fastness of Color

The dyed sample obtained in measuring the above evaluation of dyeability was subjected to dye extraction using dimethylformamide at 100° C. The rating was as follows:
○: Dye sorption ability is maintained.
Δ: Dye sorption ability is poor.
x: Dye is almost completely removed.

Critical Surface Tension

Contact angles of ethyl benzoate, bromonaphthalene, ethylene glycol and formaldehyde on a biaxially stretched film was measured at 23° C. by the use of a contact goniometer (Model G-1). Based on the results, critical surface tension was calculated. As the critical surface tension is higher, the wettability of the molding surface is better. For example, when such a molding is used as a composite material, a sufficiently high adhesion force to the substrate surface can be obtained as a result of intermolecular attraction force.

Preparation Example 1

(Production of Ultra High Molecular Weight Ethylene-Based Copolymer)

(1) Preparation of Chromium Catalyst Component

In a 200-milliliter flask with a three way stop-cock which had been purged with argon, 10.8 g (12.0 mmol) of chromium stearate and 150 ml of toluene were placed, and stirred at 40° C. for 2 hours. Then, toluene was added to adjust the total amount to 200 ml, thereby obtaining a chromium catalyst component.

(2) Production of Copolymer

As a polymerization solvent, 800 ml of dehydrated toluene was injected into a 1-liter stainless steel autoclave, and then 26.7 mmol of a toluene solution of an equimolar mixture of ethyl acrylate and aluminum trichloride was added. Then, at 17° C., 2 mmol of diethylaluminum chloride and 0.2 mmol of the chromium catalyst component prepared in (1) above were added with stirring. Then, ethylene was continuously introduced and the total pressure was maintained at 10 kg/cm$^2$G.

After the polymerization reaction was carried out for 3 hours, the pressure was returned to atmospheric pressure, and the copolymer formed was filtered off and was subjected to deashing treatment using a hydrochloric acid-methanol mixed solution. Then, acetone extraction was applied for two hours to remove an amorphous polymer. The extraction residue was dried under reduced pressure at 80° C. for 2 hours to obtain 87.1 g of a white copolymer.

In an infrared absorption spectral analysis of the copolymer thus obtained, an absorption assigned to the carbonyl group of carboxylic acid ester was observed at 1730 cm$^{-1}$, and an absorption assigned to the ether bond was observed at 1160 cm$^{-1}$. Based on the intensity of absorptions, the ethyl acrylate content of the copolymer was 0.28 mol %. As a result, catalytic activity was 7.4 kg/g.Cr. The results are shown in Table 1.

Preparation Examples 2 to 6

(Production of Ultra High Molecular Weight Ethylene-Based Copolymer)

Copolymers were produced in the same manner as in Preparation Example 1 except that the polymerization was carried out under the conditions shown in Table 1. The conditions and the results are shown in Table 1.

Preparation Example 7

(Production of Ultra High Molecular Weight Ethylene-Based Copolymer)

(1) Preparation of Chromium Catalyst Component

In a 300-milliliter flask which had been purged with argon, 1.1 g (4.45 mmol) of chromium acetate monohydrate [Cr(CH$_3$COO)$_3$.H$_2$O], 40 ml of acetic anhydride, and 40 ml of acetic acid were placed, and reacted with stirring under reflux for 20 hours. Then, acetic acid and acetic anhydride were distilled away under reduced pressure to obtain a green solid. This solid was dried in a stream of argon at 120° C. for 48 hours, and after the temperature was lowered, toluene was added to obtain 200 ml of a green catalyst slurry.

And then, 100 ml of dehydrated toluene, 2.21 g (3.8 mmol) of magnesium stearate and 0.13 g (0.38 mmol) of the above adduct were placed in a 200-milliliter flask which had been purged with argon, and were reacted at 100° C. for 2 hours to obtain a chromium catalyst component. An analysis of the chromium catalyst confirmed that it was $Cr(OROCH_3) \cdot (CH_3CO)_2O$.

(2) Production of Copolymer

A copolymer was produced in the same manner as in Preparation Example 1 except that the chromium catalyst component obtained in (1) above was used in an amount of 0.2 mmol, and the polymerization temperature and the polymerization time were 20° C. and 2 hours, respectively. The results are shown in Table 1.

Preparation Example 8

(Production of Ultra High Molecular Weight Ethylene-Based Copolymer)

A copolymer was produced in the same manner as in Preparation Example 7 except that the amount of the chromium catalyst component used was 1.0 mmol and the amount of the diethylaluminum chloride used was 40 mmol. The results are shown in Table 1.

Preparation Example 9

(Production of Ultra High Molecular Weight Ethylene-Based Copolymer)

A copolymer was produced in the same manner as in Preparation Example 7 except that the amount of the chromium catalyst component used was 1.0 mmol, the amount of the diethylaluminum chloride used was 40 mmol, and as the solvent, 800 ml of paraxylene was used in place of the toluene, and the polymerization temperature was 25° C. The results are shown in Table 1.

Preparation Example 10

(Production of Ultra High Molecular Weight Ethylene-Based Copolymer)

(1) Preparation of Chromium Catalyst Component 2.1 g (6 mmol) of chromium triacetylacetonate was dissolved in 200 ml of toluene to prepare a chromium catalyst component.

(2) Production of Copolymer

A copolymer was produced in the same manner as in Preparation Example 1 except that the chromium catalyst component obtained in (1) above was used in an amount of 0.2 mmol, the polymerization temperature was 20° C., and the polymerization time was 1.5 hours. The results are shown in Table 1.

Preparation Example 11

(Production of Ultra High Molecular Weight Ethylene-Based Copolymer)

A copolymer was produced in the same manner as in Preparation Example 10 except that the polymerization temperature was 25° C. and the polymerization time was 2 hours. The results are shown in Table 1.

Preparation Example 12

(Production of Ultra High Molecular Weight Ethylene-Based Copolymer)

A copolymer was produced in the same manner as in Preparation Example 10 except that the polymerization temperature was 30° C. and the polymerization time was 2 hours. The results are shown in Table 1.

Preparation Example 13

(Production of Ultra High Molecular Weight Ethylene-Based Copolymer)

A copolymer was produced in the same manner as in Preparation Example 1 except that as the chromium catalyst component, 0.2 mmol of $Cr(CH_2C(CH_3)_3)_3$ was used in place of chromium stearate, the polymerization temperature was 20° C., and the polymerization time was 2 hours. The results are shown in Table 1.

Preparation Example 14

(Production of Ultra High Molecular Weight Ethylene-Based Copolymer)

A copolymer was produced in the same manner as in Preparation Example 1 except that as the chromium catalyst component, 0.2 mmol of

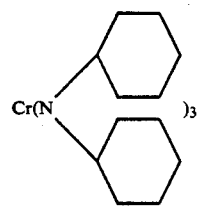

was used in place of chromium stearate, the polymerization temperature was 20° C., and the polymerization time was 2 hours. The results are shown in Table 1.

Preparation Example 15

(Production of Ultra High Molecular Weight Ethylene-Based Copolymer)

A copolymer was produced in the same manner as in Preparation Example 1 except that as the chromium catalyst component, 0.2 mmol of $CrO_2Cl_2$ was used in place of chromium stearate, the polymerization temperature was 20° C., and the polymerization time was 2 hours. The results are shown in Table 1.

Preparation Example 16

(Production of Ultra High Molecular Weight Ethylene-Based Copolymer)

(1) Preparation of Chromium Catalyst Component

In a 200-milliliter flask which had been purged with argon, 100 ml of dehydrated toluene, 2.21 g (3.8 mmol) of magnesium stearate as a polymerization activator, and 0.34 g (0.38 mmol) of chromium stearate as a chromium compound were placed, and were reacted at 100° C. for 2 hours. Then, toluene was added so that the total amount was 200 ml, to thereby obtain a chromium catalyst component.

(2) Production of Copolymer

Into a 1-liter stainless steel autoclave, 800 ml of dehydrated toluene as a polymerization solvent was injected, and then 10.0 mmol of a toluene solution containing an equimolar amount mixture of ethyl acrylate and aluminum trichloride was added. Then, at 20° C., 2 mmol of diethylaluminum monochloride and 0.1 mmol of the chromium catalyst component prepared in (1) above were added. Then, ethylene was continuously introduced and the total pressure was maintained at 10 kg/cm²G. After the polymerization was carried out for 3 hours, the pressure was returned to atmospheric pressure, and the copolymer formed was introduced into methanol, filtered off and was subjected to de-ashing treatment using a mixed solution of hydrochloric acid and methanol. Acetone extraction was carried out for 2 hours to remove an amorphous polymer. An extraction residue was dried under reduced pressure at 80° C. for 2 hours to obtain 62.5 g of a copolymer. The results are shown in Table 1.

Preparation Example 17

(Production of Ultra High Molecular Weight Ethylene-Based Copolymer)

(1) Preparation of Chromium Catalyst Component

In a 200-milliliter flask which had been purged with argon, 50 ml of dehydrated heptane and 6.45 g (20 mmol) of di-2-ethylhexyl phosphate were placed, and then 30 ml of a heptane solution containing 10 mmol of ethylbutylmagnesium was dropped over 20 minutes. Then the temperature was raised, and the reaction was carried out under reflux of heptane for 3 hours. At the end of the time, heptane was distilled away, 100 ml of toluene was added, and 0.90 g (1 mmol) of chromium stearate was added. After the reaction was carried out at 100° C. for 2 hours, toluene was added to make the total amount 200 ml to thereby obtain a chromium catalyst component.

(2) Production of Copolymer

A copolymer was produced in the same manner as in Preparation Example 16 (2) except that as the chromium catalyst component, 0.1 mmol of the chromium catalyst component prepared in (1) above was used. The results are shown in Table 1.

Preparation Example 18

(Production of Ultra High Molecular Weight Ethylene-Based Copolymer)

10.0 g of the ethylene-ethyl acrylate copolymer obtained in Preparation Example 1 was added to 150 ml of ethanol, and 10 ml of a 1N aqueous solution of sodium hydroxide and 30 ml of water were added. The reaction was carried out under reflux for 3 hours. After the completion of reaction, the temperature was lowered to room temperature, and the copolymer was filtered off, washed with water, and then after neutralization with diluted hydrochloric acid, washed with water and then with acetone. The copolymer was dried under reduced pressure at 30° C. for 2 hours to obtain a white solid copolymer.

In an infra-red absorption spectral analysis of the copolymer, an absorption assigned to the carbonyl group of carboxylic acid ester and an absorption assigned to the ether bond which had been observed in Preparation Example 1 were decreased, while on the other hand a new absorption assigned to the carbonyl group of carboxylic acid ester was detected at 1,700 $cm^{-1}$. This confirmed that the copolymer of Preparation Example 1 was partially hydrolyzed and converted into a copolymer partially containing an acrylic acid unit.

Preparation Example 19

(Production of Ultra High Molecular Weight Ethylene-Based Copolymer)

8 g of the copolymer (hydrolyzate) obtained in Preparation Example 18 was dissolved in 100 ml of paraxylene, and 8 ml of a 1N aqueous solution of sodium hydroxide was dropped. Then the reaction was carried out for 30 minutes. A gel-like product was injected into hexane to cause the copolymer to precipitate. The precipitate was washed succesively with water and acetone and dried under reduced pressure at 80° C. for 2 hours to obtain an ionized copolymer.

In an infrared absorption spectrum of the ionized copolymer thus obtained, an asymmetrial vibration peak assigned to the ionized carbonyl group was newly detected at 1560 $cm^{-1}$. The degree of ionization as determined based on absorbances at 1700 $cm^{-1}$ and 1560 $cm^{-1}$ was 28.1%.

Preparation Example 20

(Production of Ultra High Molecular Weight Ethylene-Based Copolymer)

A copolymer was produced in the same manner as in Preparation Example 1 except that as the unsaturated carboxylic acid ester, 15 mmol of methyl undecenate was used in place of ethyl acrylate, the amount of the aluminum trichloride used was 15 mmol, the polymerization temperature was 20° C., and the polymerization time was 2 hours. The results are shown in Table 1.

TABLE 1

| Preparation Example | [A] Chromium Compound*1 (mmol) | Polymerization Activator*2 (mmol) | [B] Organometallic Compound*3 (mmol) | Polymerization Solvent*4 (ml) | Unsaturated Carboxylic Acid(Ester)*5 (mmol) | Ethylene Feeding Pressure (kg/cm²G) | Lewis Acid*6 (mmol) |
|---|---|---|---|---|---|---|---|
| 1 | A 0.2 | — | 2 | I 800 | EA 26.7 | 10 | 26.7 |
| 2 | A 0.2 | — | 2 | I 800 | EA 53.4 | 10 | 53.4 |
| 3 | A 0.4 | — | 4 | I 800 | EA 106.8 | 10 | 106.8 |
| 4 | A 0.2 | — | 2 | I 800 | EA 26.7 | 10 | 106.8 |
| 5 | A 0.2 | — | 2 | I 800 | EA 26.7 | 10 | 106.8 |
| 6 | A 0.2 | — | 2 | I 800 | EA 26.7 | 10 | 106.8 |
| 7 | B 0.2 | — | 2 | I 800 | EA 26.7 | 10 | 106.8 |
| 8 | B 1.0 | — | 40 | I 800 | EA 26.7 | 10 | 106.8 |
| 9 | B 1.0 | — | 40 | J 800 | EA 26.7 | 10 | 106.8 |
| 10 | C 0.2 | — | 2 | I 800 | EA 26.7 | 10 | 106.8 |
| 11 | C 0.2 | — | 2 | I 800 | EA 26.7 | 10 | 106.8 |
| 12 | C 0.2 | — | 2 | I 800 | EA 26.7 | 10 | 106.8 |
| 13 | D 0.2 | — | 2 | I 800 | EA 26.7 | 10 | 106.8 |
| 14 | E 0.2 | — | 2 | I 800 | EA 26.7 | 10 | 106.8 |
| 15 | F 0.2 | — | 2 | I 800 | EA 26.7 | 10 | 106.8 |
| 16 | A 0.1 | G 0.75 | 2 | I 800 | EA 10.0 | 10 | 10.0 |
| 17 | A 0.1 | H 0.75 | 2 | I 800 | EA 10.0 | 10 | 10.0 |
| 20 | A 0.2 | — | 2 | I 800 | UME 15 | 10 | 15 |

| | Polymeri- | Polymeri- | | Copolymeri- | Unsaturated Carboxylic | Intrinsic Viscosity |

TABLE 1-continued

| Preparation Example | zation Temperature (°C.) | zation Time (hrs) | Yield of Copolymer (g) | zation Activity (kg/g · Cr) | Acid(Ester) Content (mol %) | of Copolymer[7] (dl/g) |
| --- | --- | --- | --- | --- | --- | --- |
| 1 | 17 | 3 | 87.1 | 8.4 | 0.28 | 30.4 |
| 2 | 17 | 3 | 86.7 | 8.3 | 0.54 | 21.5 |
| 3 | 17 | 3 | 79.8 | 7.6 | 0.31 | 24.1 |
| 4 | 20 | 2 | 82.1 | 5.1 | 0.24 | 28.2 |
| 5 | 25 | 2 | 52.2 | 5.0 | 0.42 | 25.6 |
| 6 | 30 | 2 | 32.2 | 3.7 | 0.25 | 21.6 |
| 7 | 20 | 2 | 75.8 | 7.3 | 0.17 | 16.3 |
| 8 | 20 | 2 | 91.1 | 8.8 | 1.2 | 15.4 |
| 9 | 25 | 2 | 72.8 | 7.0 | 0.74 | 19.8 |
| 10 | 20 | 1.5 | 48.8 | 4.7 | 0.38 | 17.0 |
| 11 | 25 | 2 | 41.0 | 3.9 | 0.66 | 16.2 |
| 12 | 30 | 2 | 35.4 | 3.4 | 0.86 | 15.8 |
| 13 | 20 | 2 | 92.5 | 8.9 | 0.28 | 19.5 |
| 14 | 20 | 2 | 93.1 | 9.0 | 0.25 | 16.9 |
| 15 | 20 | 2 | 102.8 | 9.9 | 0.31 | 20.5 |
| 16 | 20 | 2 | 62.5 | 12.0 | 0.1 | 22.3 |
| 17 | 20 | 2 | 70.3 | 13.5 | 0.08 | 23.4 |
| 20 | 20 | 2 | 38.0 | 3.7 | 0.04 | 16.3 |

[1]Chromium compound
A: Chromium stearate
B: Chromium acetate acetic anhydride salt
C: Chromium trisacetylacetonate
D: $Cr(CH_2C(CH_3)_3)_3$

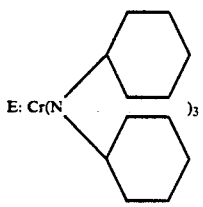

E: $Cr(N\langle\rangle)_3$

F: $CrO_2Cl_2$
[2]Polymerization activator
G: Magnesium stearate
H: Magnesium dioctylphosphate
[3]Organometallic compound
Diethylaluminum chloride
[4]Polymerization solvent
I: Toluene
J: p-Xylene
[5]Unsaturated carboxylic acid (ester)
EA: Ethyl acrylate
UME: Methyl undecenate
[6]Lewis acid
Aluminum trichloride
[7]Intrinsic viscosity [η] of copolymer
Intrinsic viscosity measured at 135° C. in decalin

EXAMPLE 1

(1) Production of Super High Molecular Weight Copolymer

In a 30-liter stainless steel pressure reactor which had been purged with argon, 12 l of toluene (water content 5 ppm) which had been subjected to dehydration treatment using Molecular Sieves 4A was placed, and maintained at 17° C. Then, 400.5 mmol (calculated as ethyl acrylate) of a toluene solution (concentration 2.0 mmol/ml) of a 1:1 mixture of ethyl acrylate and $AlCl_3$ purified by sublimation was added. Then, 30 mmol (calculated as diethylaluminum) of a toluene solution (concentration 2 mmol/ml) of diethylaluminum was introduced. Then, 3 mmol (calculated as chromium stearate) of a toluene solution (concentration 0.4 mmol/ml) of chromium stearate was added and maintained at a stirring speed of 200 rpm for 5 minutes. Then, the stirring speed was increased to 550 rpm, and while maintaining the temperature at 20° C., ethylene was charged at 10 kg/cm²G and the reaction was carried out for 48 hours.

After the completion of reaction, introduction of ethylene was stopped. After inactivation with methanol, the product was filtered off, and the solid product thus obtained was subjected to deashing treatment using a mixed solution of methanol and hydrochloric acid, and then washed with methanol and acetone. The white solid thus obtained was dried under reduced pressure at 80° C. for 2 hours. The yield of the copolymer was 525 g. In an infrared absorption spectral analysis of the copolymer, an absorption assigned to the carbonyl bond was detected at 1730 cm$^{-1}$, and an absorption assigned to the C—O—C bond was detected at 1160 cm$^{-1}$. Based on these absorption peaks and peak ratio of the methylene chain at 720 cm$^{-1}$ and 730 cm$^{-1}$, the ethyl acrylate (EA) unit content of the copolymer was 0.25 mol %, and [η] at 135° C. in decalin was 24.6 dl/g.

(2) Production of Stretched Molding 3.4 g of the copolymer obtained in (1) above was dissolved in 1.7 l of para-xylene at 120° C. and then allowed to cool at 20° C. to form a gel-like solid. This solid was filtered off, and compressed to form a disc having a diameter of 12.5 cm. After removal of the solvent by pressing at 30 kg/cm²G, the disc was pressed at 100 kg/cm²G. This was dried under reduced pressure for 5 hours while applying a load of 10 kg at room temperature to obtain a disc-like molding having an average thickness of 295 μm. From this molding, a sample 5 mm in width and 35 mm in length was cut off. This sample was provided with a sand paper at both ends thereof to prevent slippage and gripped in a holding device with a sample distance of 10 mm, and then stretched to 240 times the original size at a temperature of 125° C. at a pulling speed of 50 mm/min. In this tension state, the sample was allowed to cool to room temperature to obtain a stretched tape having a width of 0.5 mm and a thickness of 2 μm.

(3) Measurement of Tensile Physical Properties

The stretched tape obtained in (2) above was provided with a sand paper at both ends thereof and the holding device distance was adjusted to 10 mm. The stretched tape was subjected to the tensile test at 23° C. and a pulling speed of 2.5 mm/min. The results are shown in Table 2.

(4) Measurement of Critical Surface Tension

The tape obtained in (2) above was stretched in the width-wise direction to obtain a biaxially stretched film. This biaxially stretched film was measured for critical surface tension according to the aforementioned measuring method. The results are shown in Table 2.

EXAMPLES 2 AND 3

The same copolymer as used in Example 1 was stretched at the ratio shown in Table 2, and the sample thus obtained was measured for tensile physical properties and so on. The results are shown in Table 2.

EXAMPLE 4

(1) Production of Ultra High Molecular Weight Copolymer

In a 1.4-liter stainless steel pressure reactor purged with argon, 800 ml of dehydrated toluene was placed. While maintaining at 23° C., 26.7 mmol of a toluene solution (concentration 2.0 mmol/ml) of a 1:1 mixture of ethyl acrylate and $AlCl_3$ was added, and then 2.0 mmol of a toluene solution (concentration 2.0 mmol/ml) of diethylaluminum chloride was added. Then, 0.2 mmol of a toluene solution (concentration 2.0 mmol/ml) of chromium trisacetylacetonate was added and maintained at a stirring speed of 200 rpm for 5 minutes. Then the stirring speed was increased to 500 rpm, and while maintaining the temperature at 25° C., ethylene was introduced at 10 kg/cm²G, and the reaction was carried out for 120 minutes. After the completion of reaction, the product was treated in the same manner as in Example 1 to obtain 21.9 g of a white polymer.

(2) Production of Stretched Molding

The copolymer obtained in (1) above was processed in the same manner as in Example 1 (2) to obtain a stretched tape.

(3) Measurement of Tensile Physical Properties and Critical Surface Tension

The stretched tape obtained in (2) above was measured for tensile physical properties and so on in the same manner as in Example 1 (3), (4). The results are shown in Table 2.

EXAMPLES 5 TO 7

The same copolymer as used in Example 4 was stretched at the ratio shown in Table 2 to obtain a sample. The sample thus obtained was measured for tensile physical properties and so on in the same manner as in Example 2. The results are shown in Table 2.

EXAMPLE 8

In the same manner as in Example 4 except that chromium stearate was used in place of chromium trisacetylacetonate, the polymerization temperature was 20° C., and the polymerization time was 126 minutes, 52.1 g of a copolymer was obtained.

A sample was obtained in the same manner as in Example 1 except that the stretch ratio was changed to 114 times, and the sample was measured for tensile physical properties and so on in the same manner as in Example 1. The results are shown in Table 2.

EXAMPLES 9 AND 10

The same copolymer as obtained in Example 8 was stretched at the ratio shown in Table 2. The sample thus obtained was measured for tensile physical properties and so on in the same manner as in Example 1. The results are shown in Table 2.

EXAMPLE 11

(1) Production of Ultra High Molecular Weight Copolymer

In a 300-milliliter flask purged with argon, 9.88 g (40 mmol) of chromium acetate monohydrate ($Cr(CH_3COO)_3 \cdot H_2O$), 140 ml of acetic anhydride and 140 ml of acetic acid were placed and reacted under reflux for 20 hours while stirring. At the end of the time, acetic acid and acetic anhyride were distilled away under reduced pressure to obtain a green solid. This solid was dried in a stream of argon at 120° C. for 48 hours. After the temperature was lowered, toluene was added to obtain 200 ml of a green catalyst slurry (chromium catalyst component).

Copolymerization was carried out in the same manner as in Example 4 except that the chromium catalyst component as obtained above was used in place of chromium acetylacetonate, the chromium catalyst component was 1.0 mmol, diethylaluminum chloride was 40 mmol, the polymerization temperature was 20° C., and the polymerization time was 180 minutes. The yield of the copolymer was 91.1 g.

(2) Production of Stretched Molding

The copolymer obtained in (1) above was processed in the same manner as in Example 1 (2) to obtain a stretched tape.

(3) Measurement of Tensile Physical Properties and Critical Surface Tension

The stretched tape obtained in (2) above was measured for tensile physical properties and so on in the same manner as in Example 1 (3), (4). The results are shown in Table 2.

EXAMPLE 12

Copolymerization was carried out in the same manner as in Example 4 except that a 5-liter autoclave was used in place of the 1.4-liter autoclave, the amount of toluene was 3.2 l, 0.8 mmol of chromium stearate was used in place of chromium trisacetylacetonate, the amount of diethylaluminum chloride was 8.0 mmol, the amount of the 1:1 mixture of ethyl acrylate and $AlCl_3$ was 106.8 mmol, and the reaction was carried out at a temperature of 20° C. for 170 minutes. The yield of the copolymer was 326.1 g. A sample obtained from the above copolymer was stretched at a ratio of 150 times and measured for tensile physical properties and so on in the same manner as in Example 1. The results are shown in Table 2.

EXAMPLES 13 to 17

The same copolymer as obtained in Example 12 was stretched at the stretch ratio shown in Table 2. The sample thus obtained was measured for tensile physical properties and so on in the same manner as in Example 2. The results are shown in Table 1.

EXAMPLE 18

A copolymer was produced in the same manner as in Example 8 except that the amount of the 1:1 mixture of ethyl acrylate and aluminum chloride used was changed from 26.7 mmol to 53.4 mmol and the reaction was carried out at 15° C. for 180 minutes. The yield of the copolymer was 66.7 g. This copolymer was stretched to 206 times, and the sample thus obtained was measured for tensile physical properties and so on in the same manner as in Example 1. The results are shown in Table 2.

EXAMPLES 19 AND 20

The same copolymer as obtained in Example 18 was stretched at the stretch ratio shown in Table 2. The sample thus obtained was measured for tensile physical properties and so on in the same manner as in Example 2. The results are shown in Table 1.

EXAMPLE 21

(1) Production of Hydrolyzed Copolymer 5.0 g of the same copolymer as obtained in Example 18 was dissolved in 1.0 l of para-xylene at 120° C., and a solution of 4 g of sodium hydroxide dissolved in a mixed solution (2:1 by volume) of ethanol and water dropped thereto. The reaction was carried out for 20 minutes, and then cooled. The total mixture was precipitated in ethanol and after filtration, was sufficiently neutralized with hydrochloric acid. Thereafter, it was washed with water and then with acetone, and was dried under reduced pressure at 80° C. for 2 hours. In an infrared absorption spectral analysis of the copolymer thus obtained, an absorption assigned to the carbonyl group of carboxylic acid ester and an absorption assigned to the ether bond as detected in Example 18 disappeared, and an absorption assinged to the carbonyl group of carboxylic acid was newly detected at 1700 $cm^{-1}$. This confirmed that the copolymer of Example 18 was hydrolyzed into an ethylene-acrylic acid copolymer.

(2) Production of Stretched Molding

The copolymer obtained in (1) above was processed in the same manner as in Example 1 (2) to obtain a stretched tape.

(3) Measurement of Tensile Physical Properties and Critical Surface Tension

The stretched tape obtained in (2) above was measured in the same manner as in Example 1 (3), (4). The results are shown in Table 2.

EXAMPLE 22

(1) Production of Hydrolyzed Copolymer 10.0 g of the copolymer obtained in Example 18 was introduced into 150 ml of ethanol, and after addition of 10 ml of a 1N aqueous solution of sodium hydroxide, the reaction was carried out under reflux for 3 hours. After the completion of the reaction, the temperature was lowered to room temperature, and then the copolymer was filtered off, washed with water and then after neutralization with diluted hydrochloric acid, washed with water and then with acetone. It was then dried under reduced pressure at 80° C. for 2 hours to obtain a white solid copolymer. In an infrared absorption spectral analysis of the copolymer thus obtained, as well as the absorption assigned to the carbonyl group of carboxylic acid ester in the vicinity of 1730 $cm^{-1}$, an absorption assigned to the carbonyl group of carboxylic acid was detected at 1700 $cm^{-1}$. This confirmed that the copolymer of Example 18 was partially hydrolyzed. The rate of hydrolysis as determined from absorbances at 1730 $cm^{-1}$ and 1700 $cm^{-1}$ was 47.3%.

(2) Production of Stretched Molding

The copolymer obtained in (1) above was processed in the same manner as in Example 1 (2) to obtain a stretched tape.

(3) Measurement of Tensile Physical Properties and Critical Surface Tension

The stretched tape obtained in (2) above was measured for tensile physical properties and critical surface tension in the same manner as in Example 1 (3), (4). The results are shown in Table 2.

EXAMPLE 23

(1) Production of Ionized Copolymer 5 g of a copolymer obtained in the same manner as in Example 21 was dissolved in 1.0 l of para-xylene at 120° C., and 10 ml of a 1N sodium hydroxide solution was dropped and the reaction was carried out for 30 minutes. The gel-like product thus obtained was precipitated by introducing into hexane, washed with water and then with acetone, and dried under reduced pressure at 80° C. for 2 hours to obtain an ionized copolymer. In an infrared absorption spectral analysis of the ionized copolymer, an asymmetrical vibration peak assinged to the ionized carbonyl group was newly detected at 1560 $cm^{-1}$. The degree of ionization as determined from absorbances at 1700 $cm^{-1}$ and 1560 $cm^{-1}$ was 28.9%.

(2) Production of Stretched Molding

The copolymer obtained in (1) above was processed in the same manner as in Example 1 (2) to obtain a stretched tape.

(3) Measurement of Tensile Physical Properties and Critical Surface Tension

The stretched tape obtained in (2) above was measured for tensile physical properties and critical surface tension in the same manner as in Example 1 (3) and (4). The results are shown in Table 2.

COMPARATIVE EXAMPLE 1

Ultra high molecular weight polyethylene having [η] of 8.9 dl/g was stretched in the same manner as in Example 1. All of five samples were broken before a stretch ratio of 110 times was reached. For this reason, physical properties in the case of a stretch ratio of 75 times were measured in the same manner as in Example 1. The results are shown in Table 2. This sample was not sufficiently satisfactory in dyeability and fastness of color. Moreover the critical surface tension was low as compared with those of the examples, and adhesive properties were poor.

TABLE 2

|  | [η] (dl/g) | Ethyl Acrylate Content (mol %) | Stretch Ratio (times) | Stretched Tape Width (mm) | Stretched Tape Thickness (μm) | Modulus in Tension (GPa) | Strength at Break (GPa) | Dye-ability | Fastness of Color | Critical Surface Tension (dyne/cm) |
|---|---|---|---|---|---|---|---|---|---|---|
| Example 1 | 24.6 | 0.25 | 240 | 0.5 | 2 | 194 | 4.4 | ○ | ○ | 35 |
| Example 2 | " | " | 130 | 1.6 | 4 | 151 | 3.4 | ○ | ○ | " |
| Example 3 | " | " | 76 | 2.4 | 5 | 81 | 2.2 | ○ | ○ | " |
| Example 4 | 15.3 | 0.71 | 300 | 0.1 | 1.0 | 173 | 4.0 | ○ | ○ | 36 |
| Example 5 | " | " | 252 | 1.9 | 2 | 112 | 2.9 | ○ | ○ | " |
| Example 6 | " | " | 161 | 2.1 | 3 | 94 | 2.3 | ○ | ○ | " |
| Example 7 | " | " | 34 | 3.1 | 8 | 41 | 1.5 | ○ | ○ | " |
| Example 8 | 30.4 | 0.24 | 114 | 2.0 | 3 | 96 | 4.0 | ○ | ○ | 35 |
| Example 9 | " | " | 90 | 2.0 | 5 | 80.1 | 2.2 | ○ | ○ | " |
| Example 10 | " | " | 23 | 3.5 | 11 | 20.5 | 1.5 | ○ | ○ | " |
| Example 11 | 14.4 | 0.71 | 115 | 2.1 | 3 | 55.4 | 1.4 | ○ | ○ | 36 |
| Example 12 | 16.0 | 0.6 | 150 | 1.0 | 5 | 124 | 2.5 | ○ | ○ | " |
| Example 13 | " | " | 97 | 1.4 | 5 | 88 | 2.2 | ○ | ○ | " |
| Example 14 | " | " | 82 | 1.15 | 9 | 69 | 2.1 | ○ | ○ | " |
| Example 15 | " | " | 66 | 2.4 | 6 | 56 | 1.5 | ○ | ○ | " |
| Example 16 | " | " | 64 | 1.9 | 10 | 44 | 1.3 | ○ | ○ | 35 |
| Example 17 | " | " | 39 | 1.6 | 11 | 39 | 1.2 | ○ | ○ | " |
| Example 18 | 21.5 | 0.54 | 206 | 1.1 | 3 | 132 | 3.0 | ○ | ○ | 36 |
| Example 19 | " | " | 96 | 1.9 | 9 | 57 | 1.7 | ○ | ○ | " |
| Example 20 | " | " | 75 | 2.0 | 14 | 42 | 1.5 | ○ | ○ | " |
| Example 21 | Hydrolytic product of Example 18 | | 145 | 1.0 | 5 | 140 | 2.4 | ○ | ○ | 37 |
| Example 22 | Hydrolytic product of Example 18 | | 120 | 1.5 | 4 | 133 | 2.4 | ○ | ○ | 36 |
| Example 23 | Ionized product of Example 21 | | 138 | 1.2 | 5 | 152 | 2.6 | ○ | ○ | " |
| Comparative Example 1 | 18.9 | 0 | 75 | 2.4 | 9 | 56 | 1.6 | Δ | x | 31 |

What is claimed is:

1. A stretched molding produced by a process which comprises stretching at a temperature of 100° to 140° C. a straight chain random copolymer having a repeating unit (A) represented by the formula:

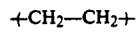

and a repeating unit (B) represented by the formula:

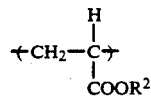

wherein $R^2$ represents a hydrogen atom, a methyl or an ethyl; said repeating unit (B) being present in a proportion of 0.05 to 1.2 mol %; and having an instrinsic viscosity as measured at 135° C. in decalin of 5 to 30.4 dl/g; and wherein the ratio of stretching is 100 to 400 times, said copolymer is produced by copolymerizing (i) ethylene and (ii) acrylic acid, methyl acrylate or ethyl acrylate, in the presence of a Lewis acid and a catalyst, said catalyst comprising a chromium compound and an organometallic compound comprising a Group I, II, III, IV or V element of the Periodic Table, wherein the chromium compound is present in a concentration of not more than 10 mmol per liter of a polymerization solvent, the organometallic compound is in a concentration of not more than 100 mmol per liter of the polymerization solvent, the molar ratio of the organometallic compound to the chromium compound is as least 2, the molar ratio of the chromium compound to the acrylic acid, methyl acrylate or ethyl acrylate is at least 0.001, the ethylene is at a pressure of not more than 100 kg/cm²G, the polymerization is carried out at a temperature of not more than 60° C., and the stretched molding having a critical surface tension of 35 to 37 dyne/cm.

2. The stretched molding of claim 1, wherein the ratio of the stretching is 250 to 350 times.

3. The stretched molding of claim 1, wherein the intrinsic viscosity as measured at 135° C. in decalin of the copolymer is 10 to 30.4 dl/g.

4. The stretched molding of claim 1, wherein the intrinsic viscosity as measured at 135° C. in decalin of the copolymer is 15 to 30.4 dl/g.

5. The stretched molding of claim 1, wherein the ratio of the stretching is 250 to 300 times.

6. The stretched molding of claim 1, wherein the stretching is carried out by a method selected from the group consisting of the monoaxial stretching method, the biaxial stretching method, the solid phase extrusion method, the gel spinning method, the gel mat super stretching method, the monocrystalline-laminated mat super stretching method, the zone stretching method and the wax blend spinning method.

7. The stretched molding of claim 1, wherein the copolymer has a molecular weight of at least 1,000,000.

* * * * *